May 23, 1944.   E. W. MACAVOY   2,349,742
FOOT ACCELERATOR SPEED CONTROL
Filed June 6, 1942

Inventor
Edmund W. Macavoy
by his Attorney

Patented May 23, 1944

2,349,742

UNITED STATES PATENT OFFICE 2,349,742

FOOT ACCELERATOR SPEED CONTROL

Edmund W. Macavoy, Port Washington, N. Y.; Mildred O. Macavoy, administratrix of said Edmund W. Macavoy, deceased, assignor to B. F. Goodrich Company, Borough of Manhattan, N. Y., a corporation of New York Application June 6, 1942, Serial No. 446,036

8 Claims. (Cl. 74—526)

This invention relates to speed or accelerator controls for motor vehicles, the object of the invention being to provide an improved foot accelerator speed control readily attachable to and operated by the accelerator pedal of a motor vehicle to limit the depression of the accelerator and thereby control the speed of the vehicle, another object being to provide a simple, inexpensive speed control readily attachable to the accelerator pedal of a motor vehicle to limit the speed of the vehicle but which is adjustable to vary such speed limit and also operative by the accelerator pedal to permit, in an emergency or necessity, any desired speed within the motor limitations.

Various devices of this kind have been patented but all, of which I am aware, are more or less complicated, expensive to manufacture and install and are applied to or carried by the footboard of the vehicle requiring, as a rule, the work of a mechanic to attach the same and the expense connected therewith.

As is well known, governors also have been used to limit the speed of a vehicle but they are dangerous for, when set at one speed, no additional speed is possible regardless of the necessity or emergency that may require such additional speed as, for instance, in climbing a hill or passing a vehicle, etc.

Therefore, the present improvement has for its primary object the provision of a very simple and inexpensive speed or accelerator control which may be manufactured for a few cents and readily attachable by the purchaser to the accelerator pedal and when so attached, can be readily adjusted to the desired speed and will limit the speed to that at which it is set but which, without changing such adjustment, can still be operated to permit increased speed when necessary by the mere manipulation of the accelerator in the ordinary way.

Thus, this simple and inexpensive device, carried and shiftable by the accelerator pedal, is readily adjustable to limit the speed of a vehicle and at the same time, it is operative to permit that speed to be increased when necessary without readjustment or any other action than the simple manipulation of the accelerator pedal.

Figure 1:
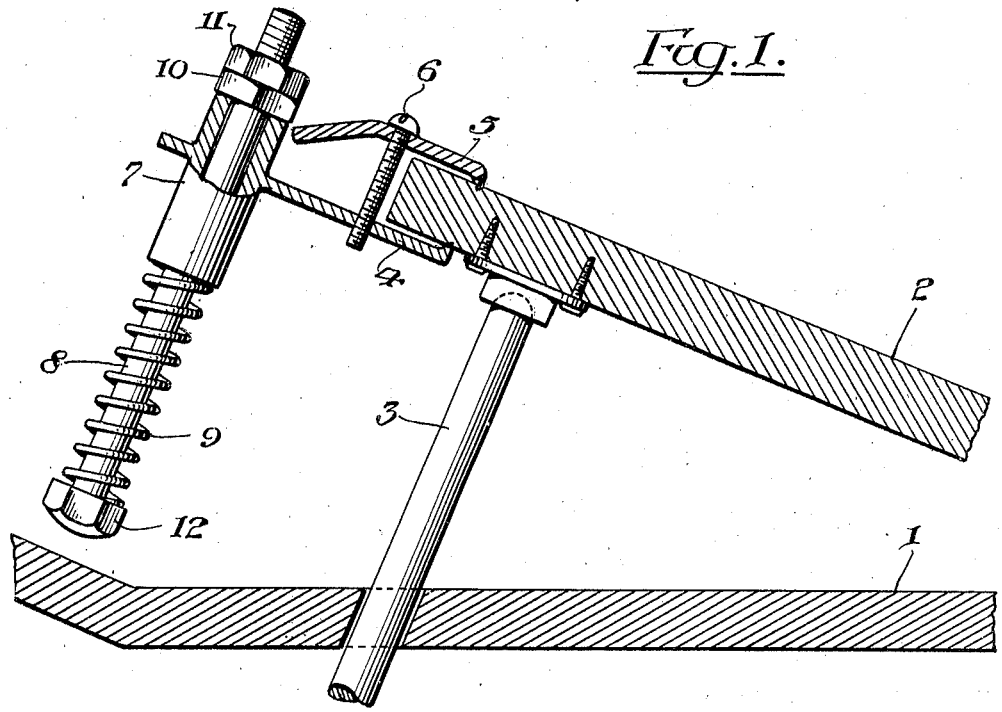
Figure 2:
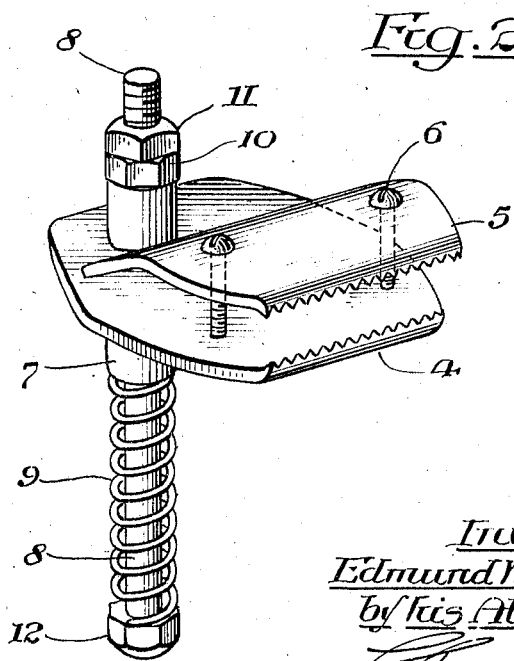

In the drawing accompanying and forming a part of this specification, Fig. 1 is a sectional view of this improved speed or accelerator control, it being adapted for use wherever an accelerator pedal is used, and Fig. 2 is a perspective view of the device detached from the accelerator pedal.

Similar characters of reference indicate corresponding parts in the several views.

Before explaining in detail the present improvement and mode of operation thereof, I desire it understood that the invention is not limited to the details of construction and arrangement of parts illustrated in the accompanying drawing since the invention is capable of other embodiments, and that the phraseology employed is for the purpose of description and not of limitation.

The floor board of the vehicle is designated by 1 and has the usual accelerator pedal 2 and carburetor throttle connection 3.

To the free end of the accelerator pedal 2 this improved device is attached, it being entirely located within the passenger or operator's part of the vehicle and entirely free of the floor board. This attachment may be accomplished in various ways but, in the form shown, it is clamped thereto and for this purpose, the device consists of a main or base plate 4 to which a shiftable member or plate 5 is attached by a plurality of machine screws 6 which are readily set by an ordinary screw driver, the clamping edges of the plates 4 and 5 being serrated or toothed securely to engage the accelerator pedal and hold the device in position on the free end thereof. The plates are tapered or beveled at their rear and clamping ends to decrease their weight, the amount of material required and improve their appearance by streamlining them.

The plate 4 is provided with a transverse sleeve 7 extending above and below it and carries an ordinary machine bolt 8, the end as the head of which is in position to engage a fixed part as the floor board of the vehicle, being held in position for this purpose by means of a coiled spring 9 located between the end and a part of the sleeve 7. Carried by a threaded part of this bolt is an adjustable nut 10 in position to engage the upper end of the sleeve 7, a check nut 11 being used to maintain the nut 10 in position against shifting.

Thus, if it is desired to limit the speed of the vehicle, for instance, to forty miles an hour, it is merely necessary, when the pedal is depressed to attain that speed, to adjust the nuts 10 and 11 so that thereafter, when the accelerator pedal 2 is depressed to the same extent, the head 12 of the bolt will engage the floor and, of course, prevent further depression of the accelerator pedal and, consequently, any increase in speed of the vehicle above forty miles per hour.

The nuts 10 and 11, of course, can be set to give any desired speed less or more than forty miles per hour in a manner which will be obvious and, as stated, when the accelerator pedal is depressed it will bring the bolt head 12 into engagement with the floor board according to the speed at which the device is set. However, should it be necessary to have increased speed in an emergency, it is only necessary for the operator to increase the pressure of his foot upon the accelerator 2 whereupon the sleeve 7 will move downwardly on the bolt 8 away from the nuts 10 and 11 and thus depress the spring 9.

Thus, without the use of a complicated expensive mechanism or one liable to get out of order or one which has to be applied to the floor board of a vehicle by a mechanic and which, therefore, is more or less in the way, I have provided a very simple, easily operated, inexpensive speed control which may be manufactured and purchased for a small amount and readily attached to the accelerator pedal and which, incidentally, is not in the way and, therefore, does not interfere with the normal use of the floor board, it requiring for its manufacture but a few small parts comprising a pair of clamping plates, a pair of machine screws for adjusting them, an ordinary machine bolt, a coiled spring and a couple of nuts and yet, notwithstanding its few parts and simplicity of construction, it will effectively control the accelerator and, therefore, the speed of a vehicle and at the same time permit that speed to be increased in an emergency merely by the operation of the accelerator pedal in the ordinary way but under increased pressure.

It is to be understood that, by describing herein in detail any particular form, structure or arrangement, it is not intended to limit the invention beyond the terms of the several claims or the requirements of the prior art.

Having thus explained the nature of my said invention and described a way of constructing and using the same although without attempting to set forth all of the forms in which it may be made or all of the modes of its use, I claim:

1. A foot accelerator speed control means comprising a stop carried by and movable with the accelerator pedal to engage a fixed part of a vehicle to limit the movement of the accelerator pedal and including means operative by the pedal to permit further movement thereof, said control means comprising clamping plates for securing it to the pedal, one of said plates carrying a stop, a spring for positioning the stop, and means for adjusting the stop.

2. A foot accelerator speed control means comprising a stop carried by and movable with the accelerator pedal to engage a fixed part of a vehicle to limit the movement of the accelerator pedal and including means operative by the pedal to permit further movement thereof, said control means comprising clamping means for attaching it to the pedal and consisting of a pair of plates, one shiftable relative to the other and carrying adjusting devices, one of said plates having a sleeve, a threaded bolt projecting thereinto with its end in position to act as a stop, an adjusting nut on the threaded portion of the bolt in position to change the setting of the bolt, and a spring between a part of said sleeve and the end of said bolt.

3. A foot accelerator speed control means attachable to and movable with the accelerator pedal of a motor vehicle and comprising a stop adapted to engage the floor of a vehicle and regulate the movement of the accelerator pedal and having means permitting further movement of the accelerator pedal on the application of additional pressure to said accelerator pedal and comprising a clamp including screws for attaching it to the pedal, a machine bolt, a coiled spring thereon, and an adjusting nut on the bolt settable to permit variation in the movement of the accelerator pedal.

4. A foot accelerator speed control means comprising means for attaching it to an accelerator pedal and including a plate having a transversely extending sleeve, a threaded bolt carried by the sleeve, a coiled spring between a part of the sleeve and the end of the bolt, and an adjusting nut on the threaded portion of the bolt in position to change the setting of the bolt.

5. A foot accelerator speed control means comprising means adapted to be suspended above and normally free of the floorboard of a vehicle and comprising a spring controlled stop operated by the accelerator to engage a fixed part of the vehicle and limit the movement of the accelerator, and cooperating means also operated by the accelerator to depress the spring and permit further movement of the accelerator.

6. A foot accelerator speed control means attachable to and movable with the accelerator pedal of a vehicle and comprising stop supporting means attachable to the accelerator pedal, a stop carried by said supporting means in position to engage a fixed part of the vehicle below the accelerator pedal to limit the downward movement of said pedal, said stop and its supporting means having relative movement, and spring means cooperating with said stop and controlled by the accelerator pedal to permit further downward movement of the pedal while the stop is in engagement with the fixed part of the vehicle below the accelerator pedal.

7. A foot accelerator speed control means attachable to and movable with the accelerator pedal of a vehicle and comprising a stop supporting sleeve attachable to the accelerator pedal and located transversely thereof, a stop carried by said supporting sleeve in position to engage the floor of a vehicle below the accelerator pedal to limit downward movement of said pedal, said stop and its supporting sleeve having relative movement, and spring means carried by said stop and controlled by the accelerator pedal to permit further downward movement of said pedal while the stop is in engagement with the floor of the vehicle.

8. A foot accelerator speed control means attachable to and movable with the accelerator pedal of a motor vehicle and adapted to engage a fixed part of the vehicle to permit a limited predetermined acceleration upon movement of said pedal under normal pressure, and means permitting increased acceleration upon further movement in the same direction of said pedal under increased pressure.

EDMUND W. MACAVOY.